(12) United States Patent
Berman

(10) Patent No.: US 6,523,116 B1
(45) Date of Patent: Feb. 18, 2003

(54) SECURE PERSONAL INFORMATION CARD DATABASE SYSTEM

(75) Inventor: Phillip Berman, Sunnyvale, CA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/262,983

(22) Filed: Mar. 5, 1999

(51) Int. Cl.[7] .............................. H04L 9/32; H04L 9/30; G06K 5/00
(52) U.S. Cl. .................. 713/182; 713/185; 713/201; 705/67; 380/30; 235/300; 235/302
(58) Field of Search ................................. 713/155, 159, 713/182, 183, 184, 185, 201, 202; 705/66, 67, 72; 380/30, 51, 54; 235/380, 381, 382, 383

(56) References Cited

U.S. PATENT DOCUMENTS

| 4,945,219 A | 7/1990 | Tanaka .................. 235/488 |
| 5,369,571 A | 11/1994 | Metts .................... 364/401 |
| 5,450,491 A | 9/1995 | McNair .................. 380/25 |
| 5,483,052 A | 1/1996 | Smith, III et al. ....... 235/472 |
| 6,005,939 A | * 12/1999 | Fortenberry et al. ..... 380/21 |
| 6,044,349 A | * 3/2000 | Tolopka et al. ........... 705/1 |

* cited by examiner

Primary Examiner—Gilberto Barron
Assistant Examiner—Justin T. Darrow

(57) ABSTRACT

A database system for personal information includes storing personal information in a database remote from the person using the public key of a person as a record identifier. The person's public key is published on a card, which may be a physical card or a virtual card, published on an Internet site in unencrypted form, together with unencrypted demographic information of the user. The person's public key is a unique identifier which becomes the person's record identifier, as well as possibly a social security number, medical record number, tax identification number, insurance file number, etc. The card contains the person's public key in eye readable and machine readable format, such as bar-coded format and can be used to gain access to personal information in the database. In an alternate embodiment the personal information may additionally be encrypted with the public key of a target agency, such as an insurance company or a bank. The target agency for the personal information obtains the card and gains access to the information by scanning the bar code and using the acquired public key of the person, plus its own private key to decrypt the information.

15 Claims, 2 Drawing Sheets

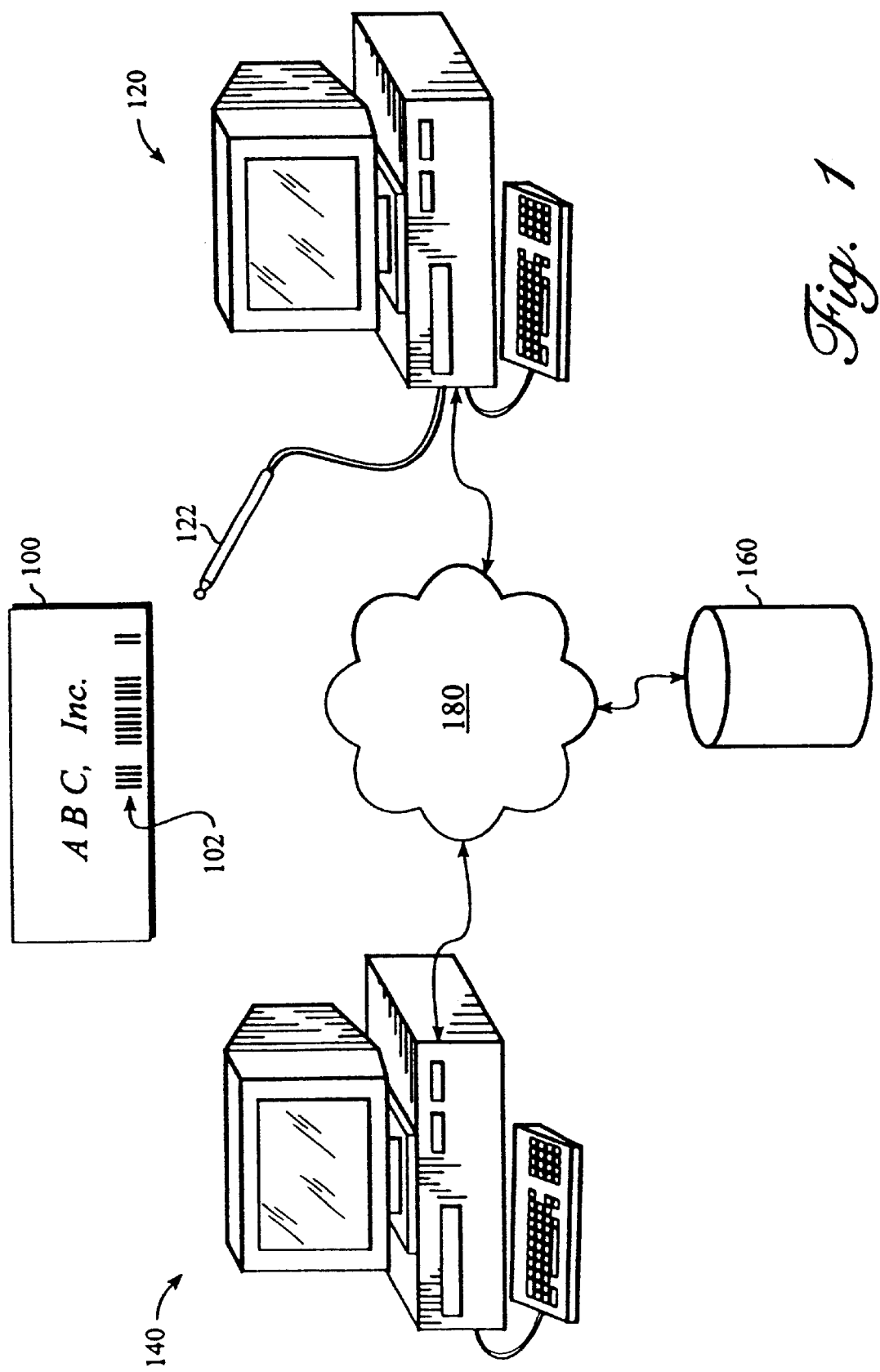

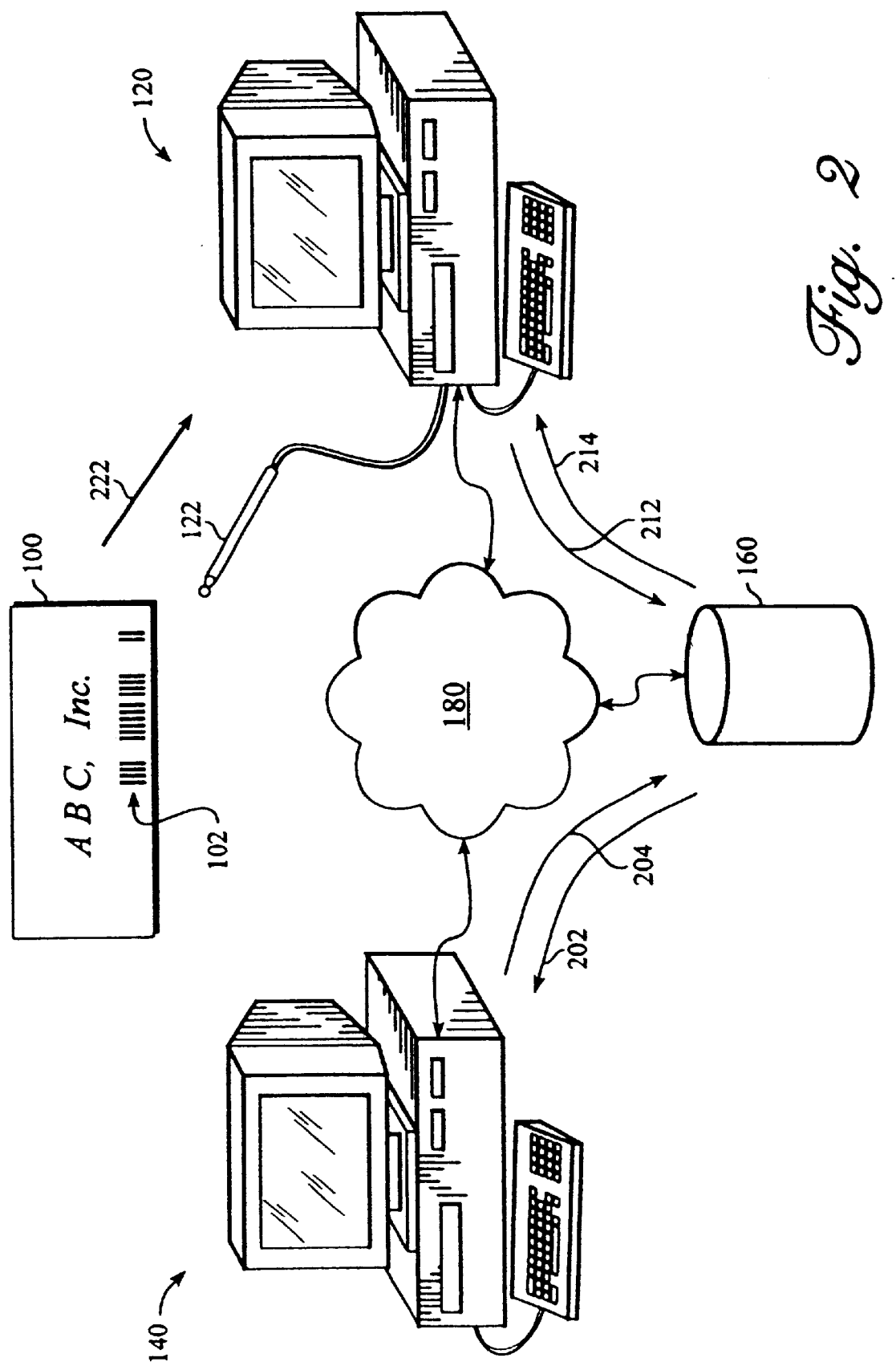

SECURE PERSONAL INFORMATION CARD DATABASE SYSTEM

TECHNICAL FIELD OF THE INVENTION

The present invention relates generally to a method and apparatus for personal information data storage and retrieval system. More specifically, the invention is directed to the use of information provided on personal cards for use with a database operated by targeted recipients of such cards.

BACKGROUND ART

The use of traditional printed cards for database purposes is exemplified by social security cards, business cards, credit cards, medical cards of various types, etc. Oftentimes business cards, medical record cards, and other cards relate to data which requires revision. Accordingly, the holder of the card must supply new information. In addition, certain organizations such as insurance companies or persons building databases must deal with large amounts of changing personal information.

An alternative to the use of paper cards is a practice commonly used at trade shows. The exchange of information occurs by using plastic cards with a magnetic stripe. The plastic cards allow exhibitors and others to take a swipe of the plastic magnetic card. To obtain a plastic card, a person completes a form with information which is entered into a database. Exhibitors and others are thus able to collect information without having to collect stacks of business cards. An exhibitor then accesses the database to obtain personal information about a contact, make phone calls, generate mailings, and several other functions.

However, not unlike business cards, this information is likely to become outdated, as change is inevitable. There is a need to enable the person whose personal information is used by others to easily update such information whether such information is demographic, medical, insurance, tax or other personal information. It is desirable that these updates are secure and low cost so that the user is encouraged to make updates so that current information is always available. Security and privacy are becoming major issues as personal information databases proliferate. It is an object of the invention to devise a personal information database system which ensures privacy and secure access so that people have confidence in use of the database system.

SUMMARY OF THE INVENTION

The above object has been met with a database system which includes providing a public and a private cryptographic key to a person. The person publishes the public key in a convenient format, such as a bar-coded or other machine readable or eye readable format on a paper or business card and publishes the card by distribution to others. The person's demographic information is read into a computer database, usually remote from the user and indexed by the person's public key. The demographic information is not encrypted. The public key is a unique identifier of the database record of the person. The person's demographic information is retrieved from the database by using the person's public key as a record identifier. In an alternate embodiment, information, intended only for specific targeted users or agencies, such as an insurance company, is encrypted with the person's private key and the targeted agency's public key. The card may be a physical card of the type now commonly carried in wallets or purses as business cards, or may be a virtual card published on the Internet. A targeted agency recipient of such a card, reads the bar code to obtain the person's public key. The recipient agency then can access the database to obtain the person's information. The person can update or cancel his information, public or private, with his private key, by accessing the database. A person's demographic information is at a low security level, perhaps unencrypted. However, information for a targeted agency is encrypted with the user's private key and the agency's public key.

In a variation of the alternate embodiment an organization, such as an Internet Service Provider (ISP), can become an escrow holder of the information. The ISP is treated as a target agency using public key-private key encryption so that only the ISP has access to the information. When the person sends the ISP a secure message to direct the information to a particular target agency, the ISP uses the target agency's public key and its own private key to re-encrypt the person's information for the target agency.

BRIEF DESCRIPTION OF THE DRAWINGS

FIG. 1 shows the system components of the invention.

FIG. 2 shows the information flow among the system components of FIG. 1.

BEST MODE FOR CARRYING OUT THE INVENTION

With reference to FIG. 1, a person's publicly available personal information card 100 typically will include demographic information such as the person's name, organization, telephone numbers for voice and fax lines, an email address and so on. The card would also contain the person's public key number, in an optically readable format as well as machine scannable indicia, such as bar-coded information 102 printed on the card. The bar-encoded information is the person's public key which could be provided to the person by a database service provider 160, or by a firm accessed through the service provider on the Internet.

Bar code 102 can be read by a scanning device 122, typically a bar code reader. The scanning device may employ wireless communication with the computer 120. The scanning device is attached to a personal computer 120 or hand-held computer. The computer includes software which operates the scanning device and receives data from the device.

The computer 120 also includes tele-communication hardware and software (not shown) for connection to a publicly accessible network 180. For example, the computer 120 may connect to the telephone network via a modem. Although not shown, computer 120 may be a node in a local area network that has access to the public network 180, either by wire or wireless means.

A database service provider 160 is connected to the public network 180. The database service provides access to its databases via transactions made over network 180. Typically, the database service includes one or more database engine servers which may be linked together via a local area network to one or more disk servers. Whatever internal configuration that database service 160 has, there is at least one communication link to network 180 which permits access by the public.

A second personal computer 140 provides access to the database service 160 by the person who is the dispenser of business card 100. Like computer 120, computer 140 includes the hardware and software needed to gain access to the service over the network 180, either by wire or wireless means.

Refer now to FIG. 2 for a description of the flow of information in accordance with the preferred embodiment of the invention. Initially, a person will establish an account with service provider 160. The series of transactions needed to do this are represented by data flows 202 and 204. While communication by computers is preferred, communication by fax or even by mail is possible. Having done so, service provider 160, or a firm accessed through the service provider, will provide to the user a pair of encryption keys including a public cryptographic key and a private cryptographic key which operate under the RSA public key-private key protocol, or a similar two key protocol. The person then publishes a card or set of cards, each bearing the public key in the formats previously described. Using the private key, the person accesses the database to input, change or delete his or her non-encrypted information. The card may be printed or otherwise formed in wallet size versions or may be a virtual card, viewable on the Internet or other wide area communications network. A recipient of the card gains access to the information by applying the public key from the card to the database to obtain the person's non-encrypted information, using the person's public key as a unique identifier of the person, i.e. an information locator number.

An alternate embodiment of the invention contemplates using the public/private key encryption technique for information targeted to special agencies, such as insurance companies, doctors, accountants, etc. This technique uses an encryption algorithm which can encrypt information using one key set, i.e. the person's private key and the public key of the targeted agency. The target agency decrypts the encrypted information using another key set, i.e. the public key of the person and its private key. An advantage of this system is that the agency using the public key of a person to decrypt the coded message targeted for it is secure in believing that the encoded message was really produced by the holder of the encoding key.

A recipient of the card, such as a target agency, would scan or otherwise read the bar code using scanner 122 or the public key can be entered by hand for an eye readable key. The bar code information 222 is read by computer 120 and stored in computer 120. The targeted agency then accesses database 160 to obtain the user's encrypted information 214, which is stored locally in computer 120. The public key of the person and the agency's private key is then applied to the encrypted information to produce a comprehensible version of the user's information. Of course, the person's public key will permit only read access to the user's information. Write access requires a private key.

Alternatively, the person encrypts personal information using the person's private key and the public key of the database service. The database service then applies the person's public key as well as its own private key to decrypt the person's encoded information. The decoded information would then be re-encrypted and then transmitted to the targeted agency's computer 120 using the private key of the database service and the public key of the target agency. This alternate approach has the advantage of allowing a user to select an number of target agencies without the need to encrypt the information each time, yet the personal information may remain encrypted at all times. That task is performed by the database service provider.

The use of a publicly accessible database 160 has the advantage of allowing a person to maintain his or her information and updating it as the need arises. The independence of the database from the person allows for the person to relocate or the targeted agency to relocate without having to change how the person's information is obtained by the other party. Changes in demographics, such as changes in a personal phone number or company affiliation or job title, can be electronically updated without one-to-one notification by parties. Database software on the agency or individual user's device (PC or palmtop wireless) can update demographic information and keep it current in bulk by synchronizing all the known public keys against the database service's database. From the agency's point of view, there is a sense of security knowing that only a specific person can change his or her information in the database, and so the information will always be valid. From the person's point of view, any encrypted information is held privately and communicated securely.

In accord with the present invention, the person's public key is a unique, multi-purpose data word which can be an all purpose records identifier, such as a social security identifier and a medical file identifier and an insurance file identifier, etc. Care must be taken to ensure that every person who will enter the database has unique data words as a key set, i.e. public and private keys. This means that data words which are private and public keys will be long because potentially every person in the country now and in the future will need unique public and private keys. For this reason, machine readable indicia are the preferred form for printed versions of these data words.

What is claimed is:

1. A method for accessing information about a user, the method comprising:

providing a publicly accessible database;

providing a private cryptographic key to a user, permitting read, write and modify access to the user's information in the database;

associating a public cryptographic key with the user information permitting read-only access to the user information in the database;

encoding the public key in a data format on business cards of the user; and distributing the business cards to recipients who can gain access to the user's information by reading the data format to obtain the public key and applying the public key to the database to obtain the user information.

2. The method of claim 1 further including scanning the data format of the business card to obtain the public key.

3. The method of claim 1 further including storing the obtained user's information on a data store of the recipient.

4. The method of claim 2 wherein the data format is a bar code format.

5. The method of claim 2 wherein the data format is an eye readable format.

6. A cryptographic data access method of the public and private key type comprising:

obtaining information associated with a person having a private key and a public key and storing a version of the information encrypted with the person's private key in an online database;

recording the person's public key on business cards of the person, distributing the business cards to others for whom the stored information is intended, whereby a recipient of the business card gains access to the information by applying the person's public key to the database to obtain the information.

7. The method of claim 6 wherein the step of recording includes printing the public key as coded indicia on the business cards.

8. The method of claim 7 wherein said card is published by printing on a wallet size card.

9. The method of claim 7 wherein said card is published by distribution on a wide area communications network.

10. The method of claim 7 wherein the coded indicia are bar-code data.

11. The method of claim 7 wherein the coded indicia comprises optically readable data.

12. The method of claim 6 wherein the information associated with the person includes demographic information.

13. The method of claim 6 wherein the storing of information in an online database is remote from the recipients of the business cards.

14. The method of claim 6 further defined by targeting said information to an agency having a private key and a public key comprising:

encrypting said information with the agency's public key as well as the person's private key and storing the encrypted information in a database, whereby the target agency gains access to the encrypted information by applying the person's public key and the agency's private key.

15. The method of claim 6 further defined by targeting said information to a selected one of a plurality of possible target agencies, each agency having a unique private and public key comprising:

transmitting the person's personal information to a database service provider using the provider's public key and the person's private key to encrypt the personal information, decrypting the person's personal information by the provider using the provider's private key and the person's public key and re-encrypting the personal information using the provider's private key and the selected target agency's public key, transmitting the re-encrypted personal information to the selected target agency, whereby the target agency gains access to the information by applying the provider's public key and the agency's private key.

* * * * *